US009202329B2

(12) United States Patent
Tymm

(10) Patent No.: US 9,202,329 B2
(45) Date of Patent: Dec. 1, 2015

(54) ELECTRONIC VOUCHERS

(75) Inventor: David Tymm, London (GB)

(73) Assignee: I-MOVO LIMITED, London (GB)

( * ) Notice: Subject to any disclaimer, the term of this patent is extended or adjusted under 35 U.S.C. 154(b) by 0 days.

(21) Appl. No.: 12/090,340

(22) PCT Filed: Nov. 24, 2006

(86) PCT No.: PCT/GB2006/004402
§ 371 (c)(1),
(2), (4) Date: Jun. 30, 2008

(87) PCT Pub. No.: WO2007/060451
PCT Pub. Date: May 31, 2007

(65) Prior Publication Data
US 2009/0132380 A1    May 21, 2009

(30) Foreign Application Priority Data

Nov. 25, 2005 (GB) .................................. 0524053.6
Feb. 20, 2006 (GB) .................................. 0603354.2

(51) Int. Cl.
| G06Q 20/00 | (2012.01) |
| G06Q 40/00 | (2012.01) |
| G07F 7/02  | (2006.01) |
| G06Q 20/04 | (2012.01) |
| G06Q 20/06 | (2012.01) |
| G06Q 20/20 | (2012.01) |
| G06Q 20/32 | (2012.01) |
| G06Q 20/34 | (2012.01) |
| G06Q 20/38 | (2012.01) |

(52) U.S. Cl.
CPC .............. *G07F 7/025* (2013.01); *G06Q 20/045* (2013.01); *G06Q 20/06* (2013.01); *G06Q 20/20* (2013.01); *G06Q 20/204* (2013.01); *G06Q 20/32* (2013.01); *G06Q 20/3255* (2013.01); *G06Q 20/342* (2013.01); *G06Q 20/387* (2013.01)

(58) Field of Classification Search
CPC ... G06Q 20/204; G06Q 20/20; G06Q 20/202; G06Q 20/40; G06Q 20/10; G06Q 40/00; G06Q 20/04; G06Q 40/02
USPC ...................................................... 705/17, 44
See application file for complete search history.

(56) References Cited

U.S. PATENT DOCUMENTS

| 4,591,190 | A | * | 5/1986  | Clark ............................. 283/102 |
| 5,265,008 | A | * | 11/1993 | Benton et al. .................... 705/44 |
| 5,642,419 | A | * | 6/1997  | Rosen ............................. 705/76 |
| 5,727,153 | A | * | 3/1998  | Powell ........................... 235/375 |
| 5,832,458 | A | * | 11/1998 | Jones .......................... 705/14.26 |
| 5,903,880 | A | * | 5/1999  | Biffar ............................. 705/39 |
| 6,134,533 | A | * | 10/2000 | Shell .......................... 705/26.82 |
| 6,330,544 | B1 | * | 12/2001 | Walker et al. ............... 705/14.36 |
| 6,370,514 | B1 | * | 4/2002  | Messner ...................... 705/14.26 |
| 6,516,302 | B1 | * | 2/2003  | Deaton et al. ............... 705/14.38 |
| 6,609,104 | B1 | * | 8/2003  | Deaton et al. ............... 705/14.39 |
| 6,934,533 | B2 | * | 8/2005  | Joyce et al. .................. 455/414.1 |
| 7,149,706 | B2 | * | 12/2006 | Duchow ...................... 705/14.39 |
| 7,152,045 | B2 | * | 12/2006 | Hoffman ......................... 705/43 |
| 7,209,733 | B2 | * | 4/2007  | Ortiz et al. ................... 455/414.1 |
| 7,308,419 | B1 | * | 12/2007 | Myers ......................... 705/14.26 |
| 7,370,012 | B2 | * | 5/2008  | Karns et al. ..................... 705/39 |
| 7,493,269 | B2 | * | 2/2009  | Fostick et al. .............. 705/14.26 |
| 7,788,129 | B2 | * | 8/2010  | Antonucci et al. ........... 705/14.3 |
| 7,837,125 | B2 | * | 11/2010 | Biskupski ..................... 235/493 |
| 7,984,851 | B2 | * | 7/2011  | Macguire ..................... 235/381 |
| 8,290,876 | B1 | * | 10/2012 | Powell ............................ 705/64 |
| 8,554,609 | B1 | * | 10/2013 | Corpus ........................... 705/35 |
| 8,566,167 | B2 | * | 10/2013 | Munjal ........................... 705/16 |
| 2002/0038237 | A1 | * | 3/2002  | Duchow ......................... 705/14 |
| 2002/0042753 | A1 | * | 4/2002  | Ortiz et al. ...................... 705/26 |
| 2002/0183046 | A1 | * | 12/2002 | Joyce et al. .................... 455/414 |
| 2003/0018523 | A1 | * | 1/2003  | Rappaport et al. .............. 705/14 |
| 2003/0055756 | A1 | * | 3/2003  | Allan ............................. 705/33 |
| 2003/0070080 | A1 | * | 4/2003  | Rosen ........................... 713/187 |
| 2003/0074259 | A1 | * | 4/2003  | Slyman et al. .................. 705/14 |
| 2003/0083934 | A1 | * | 5/2003  | Fostick et al. .................. 705/14 |
| 2003/0141359 | A1 | * | 7/2003  | Dymovsky et al. ............ 235/375 |
| 2003/0236712 | A1 | * | 12/2003 | Antonucci et al. .............. 705/26 |
| 2004/0039919 | A1 | * | 2/2004  | Takayama et al. ............ 713/180 |
| 2004/0058728 | A1 | * | 3/2004  | Fayter et al. ................... 463/25 |
| 2004/0088258 | A1 | * | 5/2004  | McCoy et al. ................... 705/43 |
| 2004/0181463 | A1 | * | 9/2004  | Goldthwaite et al. .......... 705/26 |

(Continued)

FOREIGN PATENT DOCUMENTS

EP          1564667 A1  *  8/2005

OTHER PUBLICATIONS

American National Standard Specification for Credit CardANSIX4. 13-1971 approved Apr. 28, 1971 by ANS institute.*
The last coupon: Journal of Accountancy, Aug. 1980, 150, 000002, Proquest Central, p. 24.*
An analysis of experimental buying, Fred W Morgan, Academy of Marketing Science, Journal Winter/ Spring 1978, 6, 1/2, Proquest Central p. 12.*
Role of product related conversations, Arndt Johan, Journal of Marketing research, Aug. 1967, 4, Proquest Central, p. 291.*

*Primary Examiner* — Matthew Gart
*Assistant Examiner* — Harshad Parikh
(74) *Attorney, Agent, or Firm* — Stites & Harbison PLLC; Terry L. Wright; David W. Nagle, Jr.

(57) ABSTRACT

A method for distributing and reliably redeeming electronic cash value vouchers that uses existing POS terminals. The vouchers may be distributed via mobile telephones. The voucher comprises an alphanumeric code which is entered into the standards compliant POS terminal. The system checks that the voucher is valid and provides a redemption value to the POS which can be credited by the retailer. The transaction can then be completed by the retailer using known methods.

12 Claims, No Drawings

(56) References Cited

U.S. PATENT DOCUMENTS

| | | | | |
|---|---|---|---|---|
| 2004/0193499 A1* | | 9/2004 | Ortiz et al. | 705/17 |
| 2004/0254836 A1* | | 12/2004 | Emoke Barabas et al. | 705/14 |
| 2004/0267663 A1* | | 12/2004 | Karns et al. | 705/40 |
| 2005/0149391 A1* | | 7/2005 | O'Shea et al. | 705/14 |
| 2005/0228756 A1* | | 10/2005 | Bealke et al. | 705/80 |
| 2005/0247777 A1* | | 11/2005 | Pitroda | 235/380 |
| 2006/0026070 A1* | | 2/2006 | Sun | 705/14 |
| 2006/0047570 A1* | | 3/2006 | Lenderking et al. | 705/14 |
| 2006/0060445 A1* | | 3/2006 | Molbak | 194/347 |
| 2006/0069654 A1* | | 3/2006 | Beach et al. | 705/65 |
| 2006/0129456 A1* | | 6/2006 | Walker et al. | 705/14 |
| 2006/0184399 A1* | | 8/2006 | Goldstein | 705/5 |
| 2006/0265284 A1* | | 11/2006 | Moodie et al. | 705/14 |
| 2007/0078710 A1* | | 4/2007 | Bender | 705/14 |
| 2007/0078761 A1* | | 4/2007 | Kagan et al. | 705/39 |
| 2007/0088610 A1* | | 4/2007 | Chen | 705/14 |
| 2007/0156517 A1* | | 7/2007 | Kaplan et al. | 705/14 |
| 2007/0215696 A1* | | 9/2007 | Macnish | 235/380 |
| 2008/0010114 A1* | | 1/2008 | Head | 705/14 |
| 2008/0065478 A1* | | 3/2008 | Kohlmeier et al. | 705/14 |
| 2008/0065490 A1* | | 3/2008 | Novick et al. | 705/14 |
| 2008/0097844 A1* | | 4/2008 | Hsu et al. | 705/14 |
| 2008/0140520 A1* | | 6/2008 | Hyder et al. | 705/14 |
| 2008/0166998 A1* | | 7/2008 | Sun et al. | 455/406 |
| 2008/0167991 A1* | | 7/2008 | Carlson et al. | 705/50 |
| 2008/0195536 A1* | | 8/2008 | Karns et al. | 705/39 |
| 2008/0201226 A1* | | 8/2008 | Carlson et al. | 705/14 |
| 2008/0249922 A1* | | 10/2008 | Kirch et al. | 705/37 |
| 2008/0281680 A1* | | 11/2008 | Laor | 705/10 |
| 2008/0300970 A1* | | 12/2008 | Scheibe | 705/14 |
| 2008/0319846 A1* | | 12/2008 | Leming et al. | 705/14 |
| 2009/0018908 A1* | | 1/2009 | Dersovitz | 705/14 |
| 2009/0030744 A1* | | 1/2009 | Yamada | 705/5 |
| 2009/0070218 A1* | | 3/2009 | Farmanfarmaian | 705/14 |
| 2009/0076912 A1* | | 3/2009 | Rajan et al. | 705/14 |
| 2009/0125429 A1* | | 5/2009 | Takayama | 705/35 |
| 2009/0132380 A1* | | 5/2009 | Tymm | 705/17 |
| 2009/0150234 A1* | | 6/2009 | Darst et al. | 705/14 |
| 2009/0164366 A1* | | 6/2009 | Blythe | 705/39 |
| 2009/0283589 A1* | | 11/2009 | Moore et al. | 235/382 |
| 2009/0293112 A1* | | 11/2009 | Moore et al. | 726/9 |
| 2009/0313105 A1* | | 12/2009 | Magnusson | 705/14.25 |
| 2010/0088166 A1* | | 4/2010 | Tollinger | 705/14.13 |
| 2010/0211491 A1* | | 8/2010 | Kagan et al. | 705/34 |
| 2010/0274659 A1* | | 10/2010 | Antonucci et al. | 705/14.33 |
| 2010/0274678 A1* | | 10/2010 | Rolf et al. | 705/17 |
| 2010/0312626 A1* | | 12/2010 | Cervenka | 705/14.17 |
| 2011/0060691 A1* | | 3/2011 | Grossman et al. | 705/80 |
| 2011/0213652 A1* | | 9/2011 | Gillen et al. | 705/14.26 |
| 2011/0302085 A1* | | 12/2011 | Bain | 705/44 |
| 2012/0089468 A1* | | 4/2012 | Guziel | 705/16 |
| 2012/0101831 A1* | | 4/2012 | Pitroda et al. | 705/1.1 |
| 2012/0239474 A1* | | 9/2012 | Healy et al. | 705/14.17 |
| 2013/0006861 A1* | | 1/2013 | McCoy et al. | 705/44 |
| 2013/0238497 A1* | | 9/2013 | Ramachandran et al. | 705/41 |
| 2013/0268441 A1* | | 10/2013 | Hibbard et al. | 705/44 |
| 2014/0067691 A1* | | 3/2014 | Pitroda et al. | 705/71 |
| 2014/0081734 A1* | | 3/2014 | Gangi | 705/14.26 |

\* cited by examiner

ELECTRONIC VOUCHERS

The invention relates to a method of redeeming cash value vouchers in particular, but not exclusively, vouchers distributed via portable electronic devices, such as mobile telephones.

There is a long history of consumer oriented businesses using cash value vouchers as a promotional tool to attract new customers and retain existing customers. The most widely established form of voucher is a printed voucher which can be redeemed at the point of sale in a shop. Typically, these will have a bar code printed on them, which can then be scanned in the same manner as conventional bar code and the use of bar codes helps to eliminate fraud and reduce the transaction costs for the retailer.

Whilst such paper based vouchers have been a successful promotional tool for many years, they suffer from a high up-front cost in producing the vouchers and as they are a paper based transaction also suffer from high handling costs. Due to these constraints, voucher schemes tend to have to be quite large to recoup the fixed costs. Consumers increasingly dislike carrying paper vouchers with them and as a consequence, redemption rates of paper coupons can be very low unless they are of high value. Paper vouchers of high face-value carry a significant financial risk as advances in copying technology has made it easier to reproduce vouchers fraudulently.

There have been a number of proposals to address these problems by using mobile telephones or the internet as the distribution means for an electronic voucher. In principle, the distribution costs can be kept much lower than with a paper based system, in particular for small scale voucher distributions and since the voucher is redeemed electronically, it reduces the risk of fraud or over-redemption.

However, to be able to function effectively such an e voucher scheme has to be able to work with existing point of sale equipment, otherwise few retailers would be prepared to accept the vouchers. Existing systems involve sending a bar code image to the mobile phone, which can then be scanned in the same way as an ordinary product bar code. This system suffers from the problem that many simpler mobile phones do not support the graphics required and also in practice the bar code scanner often do not read the bar code on the mobile phone display successfully. There is also no industry standard for graphical display and so the make and model of the handset must be identified before sending a bar code to a mobile phone. This is time-consuming and expensive and in practice, many customers are unwilling to engage in such a convoluted process. An additional problem with such bar code solutions is the risk of multiple redemptions as a bar code itself does not provide any means of validating if the voucher has been used before.

A further solution has been proposed in GB2397684 (Smart Voucher) in which a 19 digit payment card number is sent to a mobile phone together with the value of the voucher to be redeemed. The redemption can be carried out by keying in the data via a dedicated terminal. This approach suffers from a number of problems as it is underpinned by the notion of an "account" and a "balance". This proposes fairly high infrastructure costs to allow credit to be applied to the "account" by a participating retailer and existing legislation requires operators to implement a KYC ("Know Your Customer") process to prevent such "accounts" and "balances" to be used for money-laundering purposes. KYC processes are onerous, expensive and time-consuming to implement and are unpopular with retailers and customers alike. The prevailing geo-political climate indicates such processes and scrutiny will intensify going forward. Additionally, the provision of the voucher value together with the voucher represents a potential security hole.

EP1262930A2 relates to Voucher Redemption in Mobile Networks. It requires the mobile to directly interface with the retailer's transaction system in order to redeem the voucher. The voucher is then authenticated by means of a secure method, using a "secure key". This creates a problem with reliably linking the mobile with the retail system in order to redeem the voucher and requires additional hardware. It would also be possible to redeem the same voucher twice.

AU 2003236476 relates to a voucher purchase and redemption system. It again requires the mobile to directly interface with the retailer's transaction system in order to redeem the voucher.

The present invention therefore seeks to provide a method of distributing and redeeming cash value vouchers via portable electronic vouchers which obviates the issues of acceptability to many retailers inherent in the known systems.

According to a first aspect of the invention there is provided a method for redeeming cash value vouchers using an ISO/IEC 7812-1 and/or ANSI X4.13 compliant POS terminal comprising the steps of providing a cash value voucher comprising an alphanumeric number and having a cash value, which cash value is not related to the number, entering said number at an ISO/IEC 7812-1 and/or ANSI X4.13 compliant POS terminal, the POS terminal forming a concatenated string comprising said number, POS terminal identifier and an issuer identification number and sending the string to an acquirer, which acquirer after validating the string sends the string to the issuer, wherein the issuer authenticates the voucher number and amends the string such that the string now comprises the cash value, POS terminal identifier and an issuer identification number, which amended string authorises payment for the value of the cash value, the amended string being transmitted via the acquirer to the POS terminal to authorise the redemption of the voucher for the cash value.

According to a second aspect, the top up terminal validates the voucher by the following steps:
1. Is the Voucher Number valid? Y/N
2. Has the Voucher Number been used before/does it have any "balance of uses" left against it? Y/N such that any N value generates an invalid redemption message depending on the parameters specified in the host system for that particular voucher or campaign under which the voucher was issued, whereas if all Y values are provided then a valid redemption message is generated, wherein the redemption message comprises a concatenated alphanumeric string comprising a further alphanumeric string and the cash value stored in the host system database, this being the balance of the original voucher value less the value of the redeemed voucher.

This sequence of redemption avoids unnecessary processing time by determining the simplest conditions first with each subsequent step having a greater range of responses. This makes the voucher processing very fast and so reduces time for the retailer to process a voucher. The combination of variable also make fraudulent redemption statistically unlikely Preferably, the string is entered by swiping a card through the terminal. Preferably, the redemption logic comprises the further step of: Is the Voucher Number valid at this time? Y/N Preferably, the redemption logic comprises the further step of: Which redemption device is requesting redemption where the redemption device serial number or other means of identification is associated in the host system with a specific physical location. Preferably, the redemption logic comprises the further step of: Is the Voucher Number valid at the Device ID Y/N. Preferably, the method comprises the further step of returning the cash value voucher to the mobile phone.

The method according to the invention closely replicates how tokens are handled today and effectively dematerialises the token and redemption process.

The solution according to the invention obviates the inherent problems in the known solutions by using existing point of sale equipment to validate and redeem the voucher. The use of existing equipment and standard processes developed by card payment schemes not only reduces the cost of adopting the voucher scheme for the retailer but as the existing equipment is familiar and trusted, there is consequently a much lower cost in terms of retailer training and also a greater trust and therefore acceptance than for a solution requiring new equipment.

Exemplary embodiments of the invention will now be described in greater detail with reference to the examples.

The EFT (electronic funds transfer) network is one of the most widely adopted point of sale equipment and is now found in even most small retail stores and businesses. The EFT network operates in compliance with international standards, specifically ISO/IEC 7812-1:2000 and ANSI X4.13 and these standards apply to both standalone payment terminals and also integrated electronic point of sale equipment, in which the payment terminal is integrated with a cash register. According to these standards any payment card will be given a sixteen digit number, the first six digits of which identifier the issuer and product type with the next 9 digits forming the customer or card identifier and the final digit being a check digit.

When a customer or retailer wishes to validate a transaction request, the card is read either via the magnetic strip or via the chip. The POS terminal generates a concatenated string including an identifier corresponding to the card number and also a string corresponding to the sum for which validation has been requested. The string also includes further parameters including time and date of request, the transaction type and an identifier for the particular terminal. The POS then calls an acquirer, which checks that the data is in the correct format and the acquirer then passes the request to the card issuer. The card issuer then either authorises or refuses the requested charge back to the acquirer, which then transmits the resultant authorisation or refusal to the POS terminal.

In an example relating to a promotion on wine, participating retailers are provided with a swipe card having the same physical size and properties as a standards compliant credit card. The card is provided with a 16 digit number comprising four digits 6337 as the Issuer's identification number or IIN followed by 12 zeros.

The promoter sends a standard SMS message to the mobile telephone of a potential customer consisting of a six digit code, which code represents a cash value electronic voucher worth, say, £5.99. As modern chip and pin POS terminals support alphanumeric characters, the number may consist of digits and/or letters, although for simplicity digits will most be used.

When the customers wishes to redeem the voucher, the retailer swipes the swipe card through their standard EFTPOS terminal and when prompted for the value of the authorisation request keys in the voucher code and hits return. The EFTPOS terminal then forms the concatenated string required by the acquirer's validation check in the conventional manner and in this case the acquirer regards the voucher code to be a monetary sum.

The acquirer then seeks authorisation from the issuer. The issuer recognises from the card number that the request relates to an electronic voucher. The voucher number is then authenticated. If the voucher number is valid, then the issuer authorises a payment corresponding to the voucher value, in this case £5.99 and then cancels the vouchers. If the voucher number is invalid, then the issuer returns a standard refusal message. In the case of an authorised payment, the acquirer then returns the voucher authorisation to POS for the sum of £5.99 together with a redemption reference code. This is then printed by the POS terminal to provide a paper trail for the retailer and issuer in the same manner as for a credit card and the retailer will be reimbursed through the same mechanisms as for credit card payments.

Although in the example a six character code is used, it would be possible to use code lengths of different lengths up to a maximum of ten digits. It would also be possible to enter the sixteen digit number manually.

In a second example, also relating to a wine promotion, the promotion is not restricted to participating retailers. In this example, the promoter sends a standard SMS message to the mobile telephone of a potential customer consisting of a sixteen digit code, which code represents a cash value electronic voucher worth, say, £5.99. The code in this case comprises the same four digits relating to the issuer, say 6337, followed by 01 to denote a different product followed by a further ten digits.

To redeem the voucher, the retailer or customer simply keys in the 16 digit number into the EFTPOS terminal when prompted for the card number. When prompted for the transaction value, a zero sum is entered. The EFTPOS terminal then forms the concatenated string required by the acquirer's validation check in the conventional manner.

The acquirer then seeks authorisation from the issuer. The issuer recognises from the card number that the request relates to an electronic voucher. The "card" or voucher number is then authenticated. If the "card" or voucher number is valid, then the issuer authorises a payment corresponding to the voucher value, in this case £5.99 and then cancels the vouchers. If the voucher number is invalid, then the issuer returns a standard refusal message. In the case of an authorised payment, the acquirer then returns the voucher authorisation to POS for the sum of £5.99 together with a redemption reference code. As with the previous example this is then printed by the POS terminal to provide a paper trail for the retailer and issuer in the same manner as for a credit card and the retailer will be re-imbursed through the same mechanisms as for credit card payments.

In both examples the electronic voucher emulates a standard payment card authorisation request from the point of view of the retailer and acquirer and thus takes advantage of the existing infrastructure in place in shops. In contrast to known systems the authorised redemption sum is generally not the same as the figure assumed to be the sum for which authorisation is requested by the acquirer.

It is also possible for some EFTPOS terminals to emulate some of the steps alluded to above as a software program invoked by a single keystroke or function request obviating the need for either a plastic card or manual entry of the voucher number. It would also be possible to distribute the vouchers via e-mail, television, radio, post or the Internet.

All the parameters for a specific campaign are set at the campaign level in the host system. In an exemplary embodiment, these would include:

1. How many times can a voucher from this campaign be used?
2. When can this voucher be used? Vouchers may be valid FROM a date/time TO a date/time. They may also be valid on a number of days between specified times.

3. Where can the voucher be used? Again, this can be an individual or a range of locations.

Optional parameters are:

4. Check that redeemed voucher was issued to the corresponding mobile number
5. Check that submitted voucher value corresponds with stored voucher value In use, a consumer will be provided with an electronic voucher comprising an alphanumeric string and a cash value for the voucher. The voucher can be distributed via SMS to a mobile phone, e-mail or more traditional methods such as paper. The voucher number may be prefixed by an (IN) Issuers Identification Number issued by national standards bodies such as APACS in the UK. The voucher number presented to the consumer now resembles a credit or charge card number in that it is represented as sixteen numeric digits which may be split into four groups of four for easier reading. By way of example, a voucher number 12345678 from Issuer 633729 might be represented by the number 6337 2910 1234 5678 where additional digitals (1 & 0) in this case used to denote the transaction type of other information To redeem the voucher, the retailer may process the number as if it where a credit card by typing the full 16-digit numeric string is typed in at the electronic top up terminal followed by the value of the voucher as stated on the SMS on the consumers phone or other media. In this manner, a voucher redemptions mirrors exactly an EFT transaction and so can be accepted by any retailer who processes EFT transactions and whose terminal can be configured to route transactions based on IIN's. Alternatively, depending on the terminal design a swipe card could be used or a small software program could be installed and preconfigured to add the IIN to the Voucher No. to streamline the process. The top up terminal then transmits a redemption message to a service provider's server. The redemption message contains the following elements: Voucher number; redemption device type (in this example a top up terminal) and the terminal ID and a mobile telephone number.

The voucher is then validated using the following sequential logic:

1. Is the Voucher Number valid? Y/N

In the case that the device used to validate the voucher may be programmed to collect the mobile phone number of the consumer redeeming the voucher, then the redemption message may include the mobile phone number and the following steps:

2. Does the message contain a Mobile Phone Number? Y/N
3. Was the Voucher Number issued to the Mobile Phone Number? Y/N Then for both EFTPOS and top up terminals 4. Has the Voucher Number been used before/does it have any "balance of uses" left against it? Y/N An N value at any stage of the sequential validation logic will generate an Invalid Redemption message, which is transmitted to the device requesting redemption detailing why the redemption has failed. Step 1 relates to the validity of the request message and Step 4 provides the feature of checking whether an attempt has been made to previously redeem the voucher and if so, whether the whole voucher was redeemed or merely part of the voucher. It would also permit multiple use of a voucher. For example, if the voucher related to a cinema ticket, it would be possible for a single voucher to enable say 4 trips to the cinema rather than having to issue four separate vouchers for the same value to the same mobile telephone.

Depending on the scheme design, it is possible to include further steps, which can be switched on or off depending on the requirements of the individual scheme. These additional steps include:

5. Is the voucher number valid at this time? Y/N
6. Is the Voucher number valid at the Device ID?

Step 5 permits a time limited scheme for example. Step 6 permits schemes that are limited to a particular retailer or retail group, for example.

In the event that all Y values are generated, then a valid redemption message is generated. The redemption message may comprise a concatenated alphanumeric string comprising a further alphanumeric string and if not all the voucher value has been exhausted, a cash value, which may be zero. If not all of the voucher value has been exhausted, a non zero value is returned to the redemption device, which value will be lower than the original cash value.

The cash value returned as part of the valid redemption message is then stored against the device ID. The system then only needs to hold the balance against a retailer account rather than a personal account with the known systems. The retailer account comprises simply the balance of net difference of issued and redeemed vouchers, reflecting any payments or credits at any given point in time. The balance of this account could then be settled on a monthly basis using the standard industry mechanisms.

Once the redemption message is returned to the device, if there is a balance on the voucher value, then this is returned to the consumer. This can be in the same manner that the original voucher was distributed such as a slip of paper from the top up terminal, an SMS to the mobile phone number, by re-swiping the swipe card or via an e-mail. This approach permits a much quicker and cheaper roll out of individual schemes.

The method according to this aspect of the invention permits the sale and redemption of variable value vouchers which replicates all aspects of traditional gift voucher schemes without the need to maintain personal accounts.

What is claimed is:

1. A method for authorizing the redemption of cash value vouchers using an ISO/IEC 7812-1:2000 compliant POS terminal comprising the steps of:

providing a cash value voucher comprising a voucher number, the voucher number having a cash value that is not included in the voucher number;

entering said voucher number at an ISO/IEC 7812-1:2000 compliant POS terminal, the POS terminal forming a concatenated string comprising said voucher number, a POS terminal identifier and an issuer identification number to thereby emulate a standard payment card authorization request; and sending the concatenated string to an acquirer, wherein the acquirer, after validating the string, sends the concatenated string to an issuer, wherein the issuer then authenticates the voucher number and amends the concatenated string such that the amended concatenated string further includes the cash value of the cash value voucher, and wherein the amended concatenated string enables the authorization of payment for the cash value of the cash value voucher and is transmitted via the acquirer to the POS terminal to authorize the redemption of the voucher for the cash value included in the amended concatenated string.

2. The method according to claim 1, wherein the cash value voucher is distributed to a customer via a portable electronic device.

3. The method according to claim 2, wherein the device is a mobile telephone.

4. The method according to claim 1, wherein a sixteen digit number is entered at the POS terminal, the first four digits of which comprise the issuer identification number.

5. The method according to claim 4, wherein in a subsequent step the voucher number is entered at the POS terminal.

6. The method according to claim 4, wherein the sixteen digit number further comprises the voucher number and a zero value is entered at the POS terminal in a subsequent step.

7. A method of redeeming an electronic voucher via an ISO/IEC 7812-1:2000 compliant top up or EFTPOS terminal comprising the steps of:
   providing a cash value voucher comprising a voucher number to a mobile phone, the voucher number having a cash value that is not included in the voucher number; and
   entering the voucher number at the ISO/IEC 7812-1:2000 compliant top up or EFTPOS terminal, wherein the voucher is authenticated by the following steps:
      determining whether the voucher number is valid, and
      determining whether the voucher number has been used before and whether it has any "balances of uses" left against it,
      generating an N value when (i) the voucher number is not valid or (ii) the voucher number has been used before and does not have any "balance of uses" left against it, such that any N value generates an invalid redemption message depending on the parameters specified in the host system for that particular voucher or campaign under which the voucher was issued, and
      generating a Y value and a valid redemption message when (i) the voucher number is valid and (ii) the voucher number has "balance of uses" left against it, wherein the redemption message comprises a concatenated string that further includes a cash value stored in the host system database.

8. The method according to claim 7, wherein the string is entered by swiping a card through the terminal or by a program installed on the redemption device simulating part of the string.

9. The method according to claim 7, comprising the further step of:
   determining whether the voucher number is valid at a time of redemption, and
   generating an N value and an invalid redemption message when the voucher number is not valid at the time of redemption, and
   generating a Y value and a valid redemption message when the voucher number is valid at the time of redemption.

10. The method according to claim 9, comprising the further step of:
    determining whether the voucher number is valid at the Device ID,
    generating an N value and an invalid redemption message when the voucher number is not valid at the Device ID, and
    generating a Y value and a valid redemption message when the voucher number is valid at the device ID.

11. The method according to claim 7, wherein the concatenated string comprises a further cash value voucher, which further cash value voucher is stored on the terminal and has a lower cash value than the first cash value.

12. The method according to claim 11, comprising the further step of returning the cash value voucher to the mobile phone.

* * * * *